United States Patent
Nam et al.

(10) Patent No.: US 9,550,923 B2
(45) Date of Patent: Jan. 24, 2017

(54) ADHESIVE COMPOSITION FOR POLARIZING PLATE, POLARIZING PLATE INCLUDING THE SAME AND OPTICAL DISPLAY INCLUDING THE SAME

(71) Applicant: SAMSUNG SDI CO., LTD., Yongin-si, Gyeonggi-do (KR)

(72) Inventors: Irina Nam, Uiwang-si (KR); Woo Jin Jeong, Uiwang-si (KR); Dong Heon Yun, Uiwang-si (KR); In Cheon Han, Uiwang-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 0 days.

(21) Appl. No.: 14/619,635

(22) Filed: Feb. 11, 2015

(65) Prior Publication Data
US 2015/0247070 A1    Sep. 3, 2015

(30) Foreign Application Priority Data

Feb. 28, 2014 (KR) .......................... 10-2014-0024704

(51) Int. Cl.
*B32B 7/12* (2006.01)
*C09J 133/06* (2006.01)
*C08F 220/18* (2006.01)

(52) U.S. Cl.
CPC .......... *C09J 133/066* (2013.01); *C08F 220/18* (2013.01); *Y10T 428/2848* (2015.01)

(58) Field of Classification Search
None
See application file for complete search history.

(56) References Cited

U.S. PATENT DOCUMENTS

| 6,524,769 B1* | 2/2003 | Ishii ........................ G03F 7/038 430/280.1 |
| 2008/0213585 A1* | 9/2008 | Moroishi ............... C09J 133/02 428/355 AC |

FOREIGN PATENT DOCUMENTS

| JP | 2012-102254 A | 5/2012 |
| KR | 10-2010-0003689 A | 1/2010 |
| KR | 10-2013-0072176 A | 7/2013 |

OTHER PUBLICATIONS

Search report from Scientific and Technical Information Center (STIC), US Patent and Trademark Office, Jun. 28, 2016.*
Reference "Biphenyl" from National Institute of Standards and Technology (NIST), Jul. 19, 2016.*

* cited by examiner

*Primary Examiner* — Anish Desai
(74) *Attorney, Agent, or Firm* — Lee & Morse, P.C.

(57) ABSTRACT

An adhesive composition for polarizing plates includes a (meth)acrylic copolymer and a biphenyl group-containing photocuring agent. A polarizing plate includes an adhesive layer formed of the adhesive composition An optical display includes the polarizing plate.

17 Claims, 1 Drawing Sheet

ADHESIVE COMPOSITION FOR POLARIZING PLATE, POLARIZING PLATE INCLUDING THE SAME AND OPTICAL DISPLAY INCLUDING THE SAME

CROSS-REFERENCE TO RELATED APPLICATION

Korean Patent Application No. 10-2014-0024704, filed on Feb. 28, 2014, in the Korean Intellectual Property Office, and entitled: "Adhesive Composition for Polarizing Plate, Polarizing Plate Including the Same and Optical Display Including the Same," is incorporated by reference herein in its entirety.

BACKGROUND

1. Field

Embodiments relate to an adhesive composition for polarizing plates, a polarizing plate including an adhesive layer formed of the adhesive composition, and an optical display including the polarizing plate.

2. Description of the Related Art

Polarizing plates may be disposed on both sides of a liquid crystal cell to control an oscillation direction of light in order that a display pattern of a liquid crystal display (LCD) may be visible. Polarizing plates may be attached to an LCD by an adhesive.

SUMMARY

Embodiments are directed to an adhesive composition for polarizing plates includes a (meth)acrylic copolymer and a biphenyl group-containing photo-curing agent.

The photo-curing agent may be represented by Formula 1:

[Formula 1]

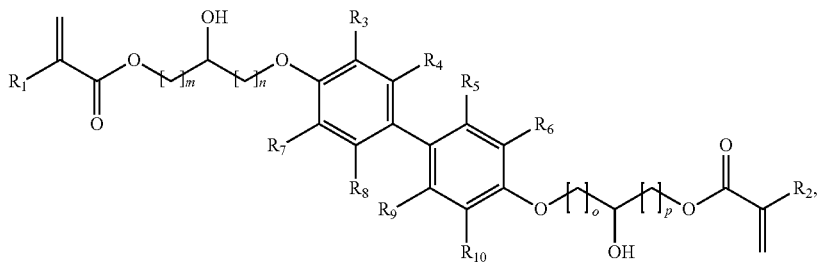

wherein $R_1$ and $R_2$ are each independently hydrogen or a methyl group, and $R_3$, $R_4$, $R_5$, $R_6$, $R_7$, $R_8$, $R_9$, and $R_{10}$ are each independently hydrogen, a $C_1$ to $C_5$ alkyl group, a $C_1$ to $C_5$ haloalkyl group, a $C_5$ to $C_{10}$ cycloalkyl group, or a $C_6$ to $C_{20}$ aryl group, and m and p are each independently 0 or 1, and n and o are each independently an integer of 1 to 4.

The photo-curing agent may have a weight average molecular weight of about 200 g/mol to about 3000 g/mol.

The (meth)acrylic copolymer may have a weight average molecular weight of about 100,000 g/mol to about 1,000,000 g/mol.

The (meth)acrylic copolymer may have a polydispersity index (PDI) of 6.0 or less.

The (meth)acrylic copolymer may include a copolymer of a monomer mixture including at least one of an alkyl group-containing (meth)acrylic monomer, a hydroxyl group-containing (meth)acrylic monomer, a carboxylic acid group-containing (meth)acrylic monomer, an alicyclic group-containing (meth)acrylic monomer, and a hetero ring-containing vinyl monomer.

The monomer mixture may include about 65 wt % to about 99 wt % of the alkyl group-containing (meth)acrylic monomer, about 0.1 wt % to about 20 wt % of the hydroxyl group-containing (meth)acrylic monomer, about 0.1 wt % to about 20 wt % of the carboxylic acid group-containing (meth)acrylic monomer, and about 0.1 wt % to about 20 wt % of the hetero ring-containing vinyl monomer.

The monomer mixture may include about 65 wt % to about 99 wt % of the alkyl group-containing (meth)acrylic monomer, about 0.1 wt % to about 20 wt % of the hydroxyl group-containing (meth)acrylic monomer, about 0.1 wt % to about 20 wt % of the carboxylic acid group-containing (meth)acrylic monomer, about 0.1 wt % to about 20 wt % of the hetero ring-containing vinyl monomer, and about 0.1 wt % to about 15 wt % of the alicyclic group-containing (meth)acrylic monomer.

The (meth)acrylic copolymer may have a trithiocarbonate structure in a backbone thereof.

The adhesive composition may further include at least one of a silane coupling agent and a peel strength regulator.

The adhesive composition may be photocurable.

The adhesive composition may have a storage modulus G' of about $1 \times 10^4$ Pa to about $5 \times 10^5$ Pa, as measured at 85° C. and at a frequency of about 0.1 rad/s to about 100 rad/s after UV curing.

The adhesive composition may have a loss modulus G of about $1 \times 10^3$ Pa to about $7 \times 10^4$ Pa, as measured at 85° C. and at a frequency of about 0.1 rad/s to about 100 rad/s after UV curing.

Embodiments are also directed to a polarizing plate. The polarizing plate includes a polarizer, a protective film formed on at least one side of the polarizer, and an adhesive layer formed on the other side of the protective film. The adhesive layer is formed of the adhesive composition as set forth above.

Embodiments are also directed to an optical display. The optical display includes the polarizing plate as set forth above.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
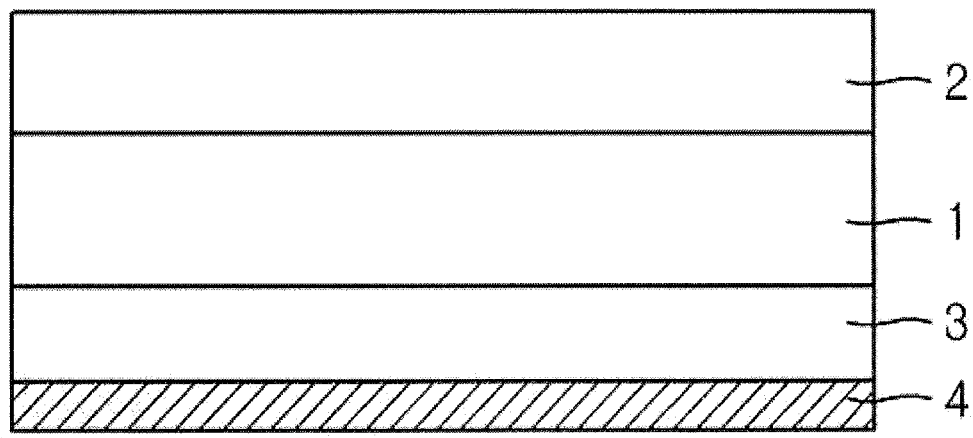
FIG. 1 illustrates a sectional view of a polarizing plate according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

An adhesive composition for polarizing plates according to an embodiment may include a (meth)acrylic copolymer and a biphenyl group-containing photocuring agent. As used herein, the term "(meth)acryl" may be interpreted as "acryl" and/or "methacryl". The biphenyl group-containing photocuring agent may include a biphenyl group and a photocurable functional group. The biphenyl group may increase cohesion, toughness, and modulus of an adhesive layer for polarizing plates.

The photocurable functional group may undergo curing reaction with the (meth)acrylic copolymer, thereby improving cohesion, toughness, and modulus of an adhesive layer for polarizing plates. As a result, the adhesive composition for polarizing plates may form an adhesive layer that may prevent the polarizing plates from suffering from peeling, dragging, bubbling, cracking, and shrinkage, or reduce the likelihood thereof, thereby providing high durability and eliminating or reducing light leakage.

The photocurable functional group may be a (meth) acrylate group. For instance, the biphenyl group-containing photocuring agent may be a polyfunctional (meth)acrylic monomer, for example, a bi- or higher functional (meth) acrylic monomer, or, for example a bi- or tri-functional (meth)acrylic monomer.

By way of example, the biphenyl group-containing photocuring agent may be represented by Formula 1:

[Formula 1]

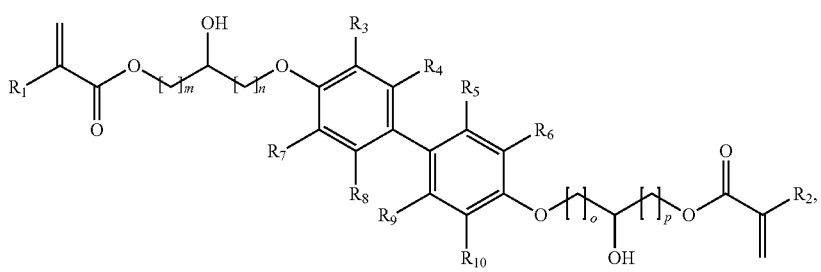

wherein $R_1$ and $R_2$ are each independently hydrogen or a methyl group, and $R_3$, $R_4$, $R_5$, $R_6$, $R_7$, $R_8$, $R_9$, and $R_{10}$ are each independently hydrogen, a $C_1$ to $C_5$ alkyl group, a $C_1$ to $C_5$ haloalkyl group, a $C_5$ to $C_{10}$ cycloalkyl group, or a $C_6$ to $C_{20}$ aryl group, and m and p are 0 or 1, and n and o are each independently an integer from 1 to 4.

The biphenyl group-containing photocuring agent may be a biphenyl epoxy di(meth)acrylate. In some implementations, the biphenyl group-containing photocuring agent may be prepared by a suitable method, or may be a suitable commercially available product.

The biphenyl group-containing photocuring agent may have a weight average molecular weight from about 200 g/mol to about 3,000 g/mol, or, for example, from about 400 g/mol to about 1,500 g/mol. Within this range, the biphenyl group-containing photocuring agent may provide a crosslinking effect.

The biphenyl group-containing photocuring agent may be present in an amount of about 0.1 parts by weight to about 20 parts by weight, for example, about 0.1 parts by weight to about 10 parts by weight, for example, 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10 parts by weight, based on 100 parts by weight of the (meth)acrylic copolymer. Within this range, the biphenyl group-containing photocuring agent may sufficiently cure the adhesive composition while securing a crosslinking effect.

The (meth)acrylic copolymer may have a weight average molecular weight of about 1,000,000 g/mol or less, for example, about 100,000 g/mol to 1,000,000 g/mol, for example, 100,000 g/mol, 200,000 g/mol, 300,000 g/mol, 400,000 g/mol, 500,000 g/mol, 600,000 g/mol, 700,000 g/mol, 800,000 g/mol, 900,000 g/mol, or 1,000,000 g/mol. Within this range, the adhesive composition for polarizing plates may provide stress relaxation for a polarizing plate and exhibit improved adhesion to glass, thereby minimizing light leakage while providing high shrinkage resistance.

The (meth)acrylic copolymer may have a polydispersity index (PDI) of about 6.0 or less, for example, higher than about 1 and less than or equal to about 6, or, for example, about 2.0 to about 6.0. Within this range, the polarizing plate may avoid peeling, bubbling, and wrinkles at corners and edges thereof, thereby enhancing durability.

The (meth)acrylic copolymer may have a glass transition temperature of about −45° C. or higher, for example from about −45° C. to about −10° C. Within this range, the adhesive composition may provide stress relaxation for a polarizing plate and may exhibit improved adhesion to glass, thereby minimizing light leakage while providing high shrinkage resistance.

The (meth)acrylic copolymer may be a copolymer of a monomer mixture including at least one of an alkyl group-containing (meth)acrylic monomer, a hydroxyl group-containing (meth)acrylic monomer, a carboxylic acid group-containing (meth)acrylic monomer, an alicyclic group-containing (meth)acrylic monomer, and a hetero ring-containing vinyl monomer.

In one implementation, the (meth)acrylic copolymer may be a copolymer of a monomer mixture including an alkyl group-containing (meth)acrylic monomer, a hydroxyl group-containing (meth)acrylic monomer, a carboxylic acid group-containing (meth)acrylic monomer, and a hetero ring-containing vinyl monomer. For example, the (meth)acrylic copolymer may be a copolymer of a monomer mixture including about 65 wt % to about 99 wt % of the alkyl group-containing (meth)acrylic monomer, about 0.1 wt % to about 20 wt % of the hydroxyl group-containing (meth)acrylic monomer, about 0.1 wt % to about 20 wt % of the carboxylic acid group-containing (meth)acrylic monomer, and about 0.1 wt % to about 20 wt % of the hetero ring-containing vinyl monomer. Within this range, the adhesive composition may provide an adhesive layer that may minimize light leakage and exhibit high durability.

In another implementation, the (meth)acrylic copolymer may be a copolymer of a monomer mixture including an alkyl group-containing (meth)acrylic monomer, a hydroxyl group-containing (meth)acrylic monomer, a carboxylic acid group-containing (meth)acrylic monomer, an alicyclic group-containing (meth)acrylic monomer, and a hetero ring-containing vinyl monomer. For example, the (meth)acrylic copolymer may be a copolymer of a monomer mixture including about 65 wt % to about 99 wt % of the alkyl group-containing (meth)acrylic monomer, about 0.1 wt % to about 20 wt % of the hydroxyl group-containing (meth)acrylic monomer, about 0.1 wt % to about 20 wt % of the carboxylic acid group-containing (meth)acrylic monomer, about 0.1 wt % to about 20 wt % of the hetero ring-containing vinyl monomer, and about 0.1 wt % to about 15 wt % of the alicyclic group-containing (meth)acrylic monomer. Within this range, the adhesive composition may provide an adhesive layer that may prevent light leakage and exhibit high durability.

In one implementation, the hetero ring-containing vinyl monomer may be present in a higher amount than the total amount of the hydroxyl group-containing (meth)acrylic monomer and the carboxylic acid group-containing (meth)acrylic monomer. In this case, the adhesive composition may provide improved light leakage characteristics and durability.

In one implementation, the carboxylic acid group-containing (meth)acrylic monomer may be present in a higher amount than the hydroxyl group-containing (meth)acrylic monomer. In this case, the adhesive composition may further improve durability.

The term "alkyl group-containing (meth)acrylic monomer" may refer to a (meth)acrylic acid ester having an unsubstituted linear or branched $C_1$ to $C_{20}$ alkyl group. Examples of the alkyl group-containing (meth)acrylic monomer may include methyl (meth)acrylate, ethyl (meth)acrylate, n-propyl (meth)acrylate, isopropyl (meth)acrylate, n-butyl (meth)acrylate, t-butyl (meth)acrylate, isobutyl (meth)acrylate, pentyl (meth)acrylate, hexyl (meth)acrylate, 2-ethylhexyl (meth)acrylate, heptyl (meth)acrylate, octyl (meth)acrylate, isooctyl (meth)acrylate, nonyl (meth)acrylate, decyl (meth)acrylate, and lauryl (meth)acrylate. These may be used alone or in combination thereof. For example, a (meth)acrylic acid ester having a $C_4$ to $C_8$ alkyl group may be used to provide improved adhesion to various surfaces, such as a glass panel or a polymer film. The alkyl group-containing (meth)acrylic monomer may be present in an amount of about 65 wt % to about 99 wt %, or, for example, about 65 wt % to about 90 wt %, or, for example, about 80 wt % to about 99 wt %, in the monomer mixture. Within this range, the adhesive composition may provide an adhesive layer that may minimize light leakage and exhibit high durability.

The term "hydroxyl group-containing (meth)acrylic monomer" may refer to a $C_2$ to $C_{20}$ alkyl group-containing (meth)acrylic acid ester having at least one hydroxyl group, a $C_5$ to $C_{20}$ cycloalkyl group-containing (meth)acrylic acid ester having at least one hydroxyl group, or a $C_6$ to $C_{20}$ aryl group-containing (meth)acrylic acid ester having at least one hydroxyl group. Specifically, the hydroxyl group-containing (meth)acrylic monomer may include at least one of 2-hydroxyethyl (meth)acrylate, 2-hydroxypropyl (meth)acrylate, 2-hydroxybutyl (meth)acrylate, 4-hydroxybutyl (meth)acrylate, and 6-hydroxyhexyl (meth)acrylate, without being limited thereto. These may be used alone or in combination thereof. For example, a $C_2$ to $C_5$ alkyl group-containing (meth)acrylic acid ester having at least one hydroxyl group may be used to enhance a crosslinking effect. The hydroxyl group-containing (meth)acrylic monomer may be present in an amount of about 0.1 wt % to about 20 wt %, or for example, about 0.1 wt % to about 10 wt %, or for example, about 0.1 wt % to about 5 wt %, in the monomer mixture. Within this range, the adhesive composition may provide an adhesive layer that may minimize light leakage and exhibit high durability. In one implementation, the hydroxyl group-containing (meth)acrylic monomer may be present in an amount of about 0.3 wt % to about 1 wt % in the monomer mixture.

The carboxylic acid group-containing vinyl monomer may include at least one of (meth)acrylic acid, β-carboxyethyl (meth)acrylate, and itaconic acid, as examples. The carboxylic acid group-containing vinyl monomer may be present in an amount of about 0.1 wt % to about 20 wt %, or, for example, about 0.1 wt % to about 10 wt %, or, for example, about 1 wt % to about 5 wt %, in the monomer mixture. Within this range, the adhesive composition may provide an adhesive layer that may minimize light leakage and exhibit high durability.

The term "alicyclic group-containing (meth)acrylic monomer" may refer to a $C_4$ to $C_{20}$ monocyclic or heterocyclic (meth)acrylic acid ester. For example, the alicyclic group-containing (meth)acrylic monomer may include at least one of cyclopentyl (meth)acrylate, cyclohexyl (meth)acrylate, and isobornyl (meth)acrylate. These may be used alone or in combination thereof. For example, a $C_{10}$ to $C_{15}$ alicyclic group-containing (meth)acrylic monomer may be used to enhance cohesion and modulus. The alicyclic group-containing (meth)acrylic monomer may be present in an amount of about 15 wt % or less, or, for example, about 0.1 wt % to about 15 wt %, or, for example, about 5 wt % to about 13 wt % in the monomer mixture. Within this range, the adhesive composition may provide an adhesive layer that minimizes light leakage and exhibits high durability.

The term "hetero ring-containing vinyl monomer" may refer to a $C_3$ to $C_{20}$ alicyclic group or $C_3$ to $C_{20}$ aromatic group-containing vinyl monomer including a hetero atom (for example, nitrogen, oxygen, sulfur, or phosphorus) in a hetero ring. For example, the hetero ring-containing vinyl monomer may include at least one of N-vinylpyrrolidone, N-(meth)acryloyl morpholine, N-vinylpyridine, N-vinyl caprolactam, vinyl caprolactone, and vinyl imidazole. For example, a pyrrolidone group-containing N-vinylpyrrolidone may be used to enhance cohesion and modulus while improving adhesion to glass. The hetero ring-containing vinyl monomer may be present in an amount of about 0.1 wt % to about 20 wt %, or, for example, about 10 wt % to about 18 wt %. Within this range, the adhesive composition may provide an adhesive layer that may minimize light leakage and exhibit high durability.

The (meth)acrylic copolymer may be polymerized using a suitable initiator that initiates polymerization of the copolymer. For example, the initiator may include at least one of azobisisobutyronitrile, dimethyl 2,2'-azobis(2-methylpropionate), 2,2-azobis(2,4-dimethyl valeronitrile), and benzoyl peroxide.

In one implementation, the (meth)acrylic copolymer may include at least one trithiocarbonate structure (*—S—C=(S)—S—* wherein * represents a binding site) in a backbone thereof. The (meth)acrylic copolymer including the trithiocarbonate structure may further provide high structural homogeneity. The trithiocarbonate structure may be inserted into the copolymer due to a polymerization process of the (meth)acrylic copolymer. Trithiocarbonate may be located at the center or distal end of the backbone of the copolymer.

The (meth)acrylic copolymer may have a gradient structure that includes a trithiocarbonate structure at the center of the backbone of the copolymer such that the copolymer is symmetrical with respect to trithiocarbonate. In the gradient structure, the trithiocarbonate structure may be located at the center of the polymer chain, and typical aromatic groups (for example, benzyl groups) originating from the trithiocarbonate compound may be located at both ends of the copolymer backbone. In addition, the gradient structure may include a structure in which monomers constituting a polymer are polymerized between the trithiocarbonate and the aromatic groups and are arranged in order of reactivity.

The (meth)acrylic copolymer may have a structure in which monomers are polymerized at both sides of the trithiocarbonate structure. The monomers may be sequentially polymerized from the outermost side of the (meth)acrylic copolymer toward the trithiocarbonate structure in descending order of polymerization speed.

The (meth)acrylic copolymer having the trithiocarbonate structure may be prepared by adding a Reversible Addition Fragmentation chain Transfer (RAFT) agent and a suitable initiator to the monomer mixture to perform RAFT polymerization. The RAFT agent may be represented by Formula 2:

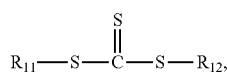

[Formula 2]

wherein $R_{11}$ and $R_{12}$ are each independently a $C_7$ to $C_{20}$ arylalkyl group.

For example, $R_{11}$ and $R_{12}$ may be a benzyl group. The RAFT agent may be dibenzyl trithiocarbonate. The RAFT agent may be prepared by a suitable method, or may be a commercially available product. The RAFT agent may be present in an amount of about 0.001 parts by weight to about 2 parts by weight, or, for example, about 0.01 parts by weight to about 2 parts by weight, based on 100 parts by weight of the alkyl group-containing (meth)acrylic monomer. The initiator may be present in an amount of about 0.001 parts by weight to about 10 parts by weight, or, for example, about 0.01 parts by weight to about 2 parts by weight, based on 100 parts by weight of the alkyl group-containing (meth)acrylic monomer.

RAFT polymerization may be carried out at about 60° C. to about 100° C. for about 1 hour to about 10 hours subsequent to adding the RAFT agent and the initiator to the monomer mixture. RAFT polymerization may be carried out in the presence of an organic solvent or without a solvent. The organic solvent may be anisole, methylethylketone, diethyl ether, dioxane, dimethoxyethane, acetonitrile, or ethyl acetate. In free radical polymerization of the (meth) acrylic copolymer, a chain transfer agent (CTA) may be used as a molecular weight regulator instead of the RAFT agent. In this case, the CTA may be present in an amount of about 0.01 parts by weight to about 5 parts by weight based on 100 parts by weight of the alkyl group-containing (meth)acrylic monomer.

In another implementation, the adhesive composition may further include a photopolymerization initiator. The photopolymerization initiator may accelerate photocuring reaction of a curing agent, thereby increasing the curing speed and curing rate of the adhesive composition. In one implementation, the photopolymerization initiator may be a suitable phosphorus-based or triazine-based photopolymerization initiator. The photopolymerization initiator may be present in an amount of about 0.1 parts by weight to about 10 parts by weight, or, for example, about 0.5 parts by weight to about 7 parts by weight, based on 100 parts by weight of the (meth)acrylic copolymer. Within this range, a photocuring process may be sufficiently performed without deteriorating transparency of the adhesive layer due to a remaining amount of the initiator.

In another embodiment, the adhesive composition may further include at least one of a silane coupling agent and a peel strength regulator. The silane coupling agent may improve adhesion between the adhesive composition and glass panels. The peel strength regulator may control peel strength of the adhesive layer to glass panels while improving durability through a build-up effect.

The silane coupling agent may be present in an amount of about 0.01 parts by weight to about 10 parts by weight, or, for example, about 0.01 parts by weight to about 5 parts by weight, based on 100 parts by weight of the (meth)acrylic copolymer. Within this range, the adhesive composition may exhibit excellent adhesion to liquid crystal panels and the (meth)acrylic copolymer may exhibit excellent storage stability.

The silane coupling agent may be a suitable silane coupling agent. Examples of the silane coupling agent may include epoxy structure-containing silicon compounds, such as 3-glycidoxypropyltrimethoxy silane, 3-glycidoxypropylmethyldimethoxysilane, 2-(3,4-epoxycyclohexyl) ethyltrimethoxysilane, or the like; polymerizable unsaturated group-containing silicon compounds, such as vinyltrimethoxysilane, vinyltriethoxysilane, (meth)acryloxypropyltrimethoxysilane, or the like; amino group-containing silicon compounds, such as 3-aminopropyltrimethoxysilane, N-(2-aminoethyl)-3-aminopropyltrimethoxysilane, N-(2-aminoethyl)-3-aminopropylmethyldimethoxysilane, or the like; and 3-chloropropyltrimethoxysilane. An epoxy structure-containing silane coupling agent may be used to provide a build-up effect.

The peel strength regulator may be a polysiloxane monomer or an oligomer thereof. The peel strength regulator may be present in an amount of about 0.1 parts by weight to about 10 parts by weight, or, for example, about 0.1 parts by weight to about 5 parts by weight, based on 100 parts by weight of the (meth)acrylic copolymer.

The adhesive composition may further include suitable additives, such as UV absorbers, antioxidants, or the like.

The adhesive composition may be used as a material for a pressure sensitive adhesive (PSA). For example, the adhesive composition may be used as a PSA adhesive for attaching a polarizing plate to a panel, for example, a liquid crystal display panel. The adhesive composition may also be used as an adhesive for attaching a plurality of optical films in a polarizing plate including a plurality of protective films. The term "polarizing plate" may refer to a polarizer alone, or to a stack structure in which at least one of a protective film, a retardation film, and a coating layer are stacked on one or both sides of the polarizer.

The adhesive composition may be a photocurable adhesive composition. The adhesive composition may be photocured or heat-cured at a wavelength from about 240 nm or 400 nm and at an irradiation dose from about 500 mJ/cm$^2$ to about 3000 mJ/cm$^2$ to form an adhesive layer. The adhesive composition, as a photocurable adhesive composition, may reduce curing time.

The adhesive composition for polarizing plates may have a storage modulus G' from about $1\times10^3$ Pa to about $1\times10^6$ Pa, or, for example, from about $1\times10^4$ Pa to about $5\times10^5$ Pa, as measured at 85° C. and at a frequency of about 0.1 rad/s to about 100 rad/s after UV curing. Within this range, the adhesive composition may have high storage modulus and may provide excellent stress relaxation to a polarizing plate.

The adhesive composition for polarizing plates may have a minimum loss modulus G from about $1\times10^2$ Pa to about $1\times10^5$ Pa, or, for example, from about $1\times10^3$ Pa to about $7\times10^4$ Pa, as measured at 85° C. and at a frequency of about 0.1 rad/s to about 100 rad/s after UV curing. Within this range, the adhesive composition may provide excellent stress relaxation for a polarizing plate.

In one implementation, after being subjected to a UV curing process, the adhesive composition for polarizing plates may have a ratio G'/G of storage modulus G' to loss modulus G from about 0.6 to about 1.5, or, for example, from about 0.7 to about 1.3. Within this range, the adhesive composition may provide a polarizing plate having excellent stress relaxation.

A polarizing plate may include an adhesive layer formed of the adhesive composition according to embodiments. The polarizing plate may include a polarizer, a protective film formed on at least one side of the polarizer, and an adhesive layer formed on the other side of the protective films. The adhesive layer may be formed of the adhesive composition according to embodiments.

In one implementation, a polarizing plate may include: a polarizer; and an adhesive composition formed on at least one side of the polarizer, wherein the adhesive composition may have a ratio G'/G of storage modulus G' to loss modulus G from about 0.6 to about 1.5 at 85° C. and at a frequency of about 0.1 rad/s to about 100 rad/s after UV curing.

FIG. 1 is a sectional view of a polarizing plate according to one embodiment. Referring to FIG. 1, the polarizing plate includes a polarizer 1, a first protective film 2 formed on an upper side of the polarizer 1, a second protective film 3 formed on a lower side of the polarizer 1, and an adhesive layer 4 formed on a lower side of the second protective film 3. The adhesive layer 4 may be stacked on one side of a liquid crystal display panel (not shown). The adhesive layer 4 may be formed of the adhesive composition according to embodiments.

For the polarizer, a suitable polyvinyl alcohol film for use in polarizing plates may be used, irrespective of a manufacturing process thereof. For example, the polyvinyl alcohol film may include a modified polyvinyl alcohol film, such as a partially formalized polyvinyl alcohol film, an acetoacetyl group modified polyvinyl alcohol film, or the like. The polyvinyl alcohol may have a degree of polymerization of, for example, about 1,500 to 4,000. Within this range, the polyvinyl alcohol may act as a polarizing substrate, and a polarizing film made of the polyvinyl alcohol may not exhibit deviation in optical properties.

The polarizer may be prepared by dyeing a polyvinyl alcohol film with iodine or dichromatic dye, followed by stretching in a predetermined direction. For example, the polarizer may be prepared through swelling, dyeing, and stretching.

The polarizer may have a thickness from about 10 μm to about 50 μm, for example.

The first and second protective films may be stacked on one or both sides of the polarizer. The protective films may be cyclic polyolefin films including amorphous cycloolefin polymer (COP), or the like; poly(meth)acrylate films; polycarbonate films; polyester films including polyethylene terephthalate (PET), or the like polyethersulfone films; polysulfone films; polyamide films; polyimide films; polyolefin films; polyarylate films; polyvinyl alcohol films; polyvinyl chloride films; polyvinylidene chloride films; or mixtures thereof. For example, the protective films may be cycloolefin polymer (COP) films, polycarbonate films, poly(meth)acrylate films, or polyester films.

Each of the first and second protective films may have a thickness from about 10 μm to about 200 μm, or, for example from about 30 μm to about 120 μm.

The adhesive layer may be formed of an adhesive composition according to embodiments. The adhesive layer may be formed by photocuring or heat-curing the adhesive composition (for example, drying the composition at 90° C. for 4 minutes) at a wavelength from about 240 nm or 400 nm and at an irradiation dose from about 500 mJ/cm$^2$ to about 3000 mJ/cm$^2$.

The adhesive layer may have a thickness from about 5 μm to about 100 μm.

Although not shown in FIG. 1, retardation films having a phase retardation function, or coating layers may be used in place of first and second protective films. For the retardation film, any suitable film polarizing plates may be used. For example, the retardation film may be a cycloolefin polymer (COP) film, a polycarbonate film, a poly(meth)acrylate film, or a polyester film.

The polarizing plate may minimize light leakage when attached to a panel, for example, a liquid crystal display panel. The polarizing plate may have a light leakage value (ΔL) from about 0 to about 0.7, for example, from about 0 to about 0.1, as represented by Equation 1:

$$\Delta L = [(a+b+d+e)/4]/c - 1 \quad \text{[Equation 1]}$$

In Equation 1, a, b, d and e are brightness values at midpoints of respective sides of a panel upon which a polarizing plate is stacked, and c is a brightness value at a central site of the panel before reliability testing.

Light leakage may be measured by a typical method.

In measurement of light leakage, a specimen may be left at 85° C. for 250 hours, or under moist-heat resistance conditions of 60° C. and 95% RH for about 250 hours, and left at 25° C. for about 1 hour or more.

A detailed method of measuring light leakage will be described below in the following description of examples.

In accordance with a further aspect, an optical display may include the polarizing plate as set forth above. The optical display may include liquid crystal displays including TFT-LCDs, organic light-emitting diode (OLED) displays, liquid crystal panels, or the like.

In one implementation, an optical display may include: a polarizer; an adhesive layer formed on at least one side of the polarizer; and a liquid crystal panel, wherein the adhesive layer may have a ratio G'/G of storage modulus G' to loss modulus G from about 0.6 to about 1.5 at 85° C. and at a frequency of about 0.1 rad/s to about 100 rad/s after UV curing.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparative Example 1

Preparation of (Meth)Acrylic Copolymer

In a 1 L 4-neck flask, 96 parts by weight of butyl acrylate (BA), 0.5 parts by weight of 2-hydroxyethylmethacrylate (HEMA), 3.5 parts by weight of acrylic acid (AA), and 85 parts by weight of ethyl acetate as a solvent were placed, followed by heating the flask to 65° C. and then maintaining the flask at 65° C. The overall reaction was carried out while supplying nitrogen at 10 cc/min. As an initiator, 0.06 parts by weight of dimethyl 2,2'-azobis(2-methylpropionate) (V601, Wako Chemical Co., Ltd.) was diluted by 50% with methylethylketone (MEK), and introduced into the flask. A reaction was performed at 65° C. for 4 hours and at 70° C. for 2 hours, thereby preparing a (meth)acrylic copolymer.

Preparative Example 2

Preparation of (Meth)Acrylic Copolymer 84.8 parts by weight of BA, 11.2 parts by weight of N-vinylpyrrolidone (NVP), 0.5 parts by weight of HEMA, 3.5 parts by weight of AA, and 50 parts by weight of MEK were added to a 1 L 4-neck flask, followed by heating the flask to 65° C. and then maintaining the flask at 65° C. The overall reaction was carried out while supplying nitrogen at 10 cc/min. 1.5 parts by weight of dibenzyltrithiocarbonate, 0.06 parts by weight of dimethyl 2,2'-azobis(2-methylpropionate) as an initiator, and 0.02 parts by weight of 2-mercaptoethanol as a chain transfer agent (CTA) were diluted by 50% with MEK, and introduced into the flask. Reaction was performed at 65° C. for 4 hours and at 70° C. for 2 hours, thereby preparing a (meth)acrylic copolymer.

Preparative Example 3

Preparation of (Meth)Acrylic Copolymer

A (meth)acrylic copolymer was prepared in the same manner as in Preparative Example 2 except that the kinds and amounts of components were changed as listed in Table 1 (unit: parts by weight).

Preparative Examples 4 to 6

Preparation of (Meth)Acrylic Copolymer (Meth)acrylic copolymers were prepared in the same manner as in Preparative Example 1 except that the kinds and amounts of each components were changed as listed in Table 1 (unit: parts by weight).

The (meth)acrylic copolymers prepared in Preparative Examples 1 to 6 had weight average molecular weights, polydispersity indexes, and glass transition temperatures as shown in Table 1.

TABLE 1

|  | Preparative Example 1 | Preparative Example 2 | Preparative Example 3 | Preparative Example 4 | Preparative Example 5 | Preparative Example 6 |
| --- | --- | --- | --- | --- | --- | --- |
| BA | 96 | 84.8 | 79.35 | 74.35 | 69.35 | 69.35 |
| NVP | — | 11.2 | 16.65 | 16.65 | 16.65 | 16.65 |
| EHMA | — | — | — | 5 | 10 | — |
| IBXA | — | — | — | — | — | 10 |
| AA | 3.5 | 3.5 | 3.5 | 3.5 | 3.5 | 3.5 |
| HEMA | 0.5 | 0.5 | 0.5 | 0.5 | 0.5 | 0.5 |
| Mw control agent | — | 0.02 | 0.02 | 0.02 | 0.02 | 0.02 |
| Conversion degree (wt %) | 84.2 | 96.28 | 96.51 | 97.34 | 96.61 | 94.26 |
| Weight average molecular weight (g/mol) | 1,100,000 | 260,000 | 250,000 | 240,000 | 250,000 | 240,000 |
| Polydispersity index | 5.8 | 3.0 | 2.8 | 3.1 | 3.0 | 3.1 |
| Glass transition temperature (° C.) | −44.5 | −23.29 | −28.31 | −22.48 | −20.21 | −16.74 |

*BA: Butyl acrylate

*NVP: N-vinylpyrrolidone

*EHMA: 2-Ethylhexyl methacrylate

*IBXA: Isobornyl acrylate

*AA: Acrylic acid

*HEMA: 2-hydroxyethylmethacrylate

*Conversion degree: measured by GC analysis

Details of components used in Examples and Comparative Examples are as follows.

(A) (Meth)acrylic copolymer: (A1) (meth)acrylic copolymer prepared in Preparative Example 1, (A2) (meth) acrylic copolymer prepared in Preparative Example 2, (A3) (meth)acrylic copolymer prepared in Preparative Example 3, (A4) (meth)acrylic copolymer prepared in Preparative Example 4, (A5) (meth)acrylic copolymer prepared in Preparative Example 5, (A6) (meth)acrylic copolymer prepared in Preparative Example 6.

(B) Curing agent: Curing agent (biphenyl epoxy diacrylate, Mitsubishi Gas Chemical Co., Ltd.) (in Formula 1, $R_1$, $R_2$, $R_3$, $R_4$, $R_5$, $R_6$, $R_7$, $R_8$, $R_9$ and $R_{10}$ are all hydrogen, and m, p, n, and o are 1, respectively)

(b) Curing agent: (b1) 9,9'-bis[4-(2-acryloyloxyethoxy) phenyl]fluorine (A-BREF, Shin-Nakamura Chemical Co., Ltd.), (b2) bisphenol A epoxy diacrylate (Miramer PE210, Miwon Co., Ltd.), (b3) M315 (alicyclic multifunctional acrylate), (b4) trimethylolpropane adduct of diisocyanate Coronate L (Nippon Polyurethane Industry Co., Ltd., Japan).

(C) Silane coupling agent: 3-glycidoxypropyltrimethoxysilane (KBM-403, Shin-Etsu Chemical Co., Ltd.)

(D) Peel strength regulator: Polysiloxane oligomer (MAC-2101, Soken Co., Ltd.)

Example 1

20 parts by weight of the (A2) (meth)acrylic copolymer prepared in Preparative Example 2, 1 part by weight of the (B) curing agent, 0.06 parts by weight of the (C) silane coupling agent, and 0.2 parts by weight of the (D) peel strength regulator were mixed, followed by stirring at 25° C. for 30 minutes, thereby preparing an adhesive composition for polarizing plates. Then, the prepared composition was cured using a curing method as listed in Table 2, thereby providing an adhesive layer for polarizing plates.

Examples 2 to 5 and Comparative Examples 1 to 4

Adhesive compositions were prepared in the same manner as in Example 1 except that the kinds of (meth)acrylic copolymer and the kinds and amounts of curing agents were changed as listed in Table 2 (unit: part by weight, based on solid content). Then, the prepared compositions were cured using curing methods as listed in Table 2, thereby providing adhesive layers for polarizing plates.

The prepared adhesive compositions for polarizing plates were evaluated as to the following properties. Results are shown in Table 3.

Figure 2:
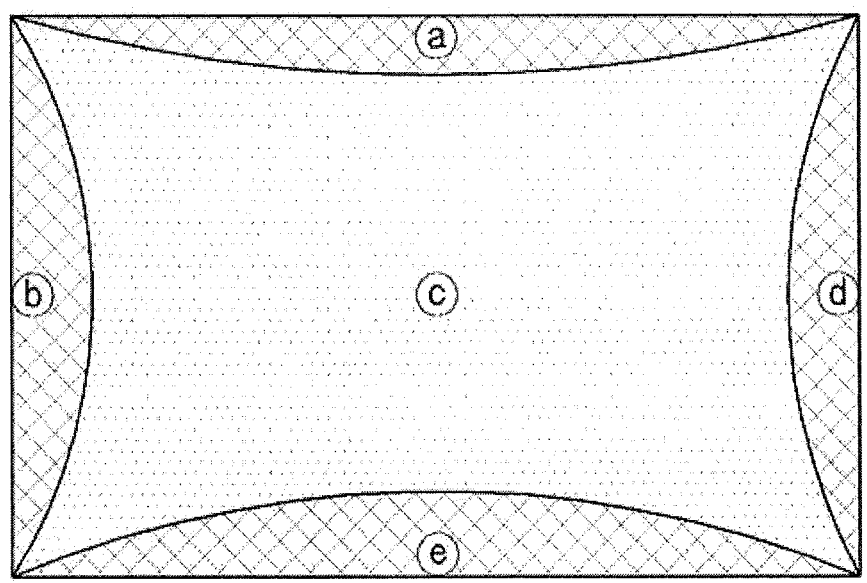
FIG. 2 illustrates measurement locations for detecting light leakage on a panel.

Evaluation of Properties (1) Light leakage: In Examples 1 to 5 and Comparative Examples 1 to 3, the adhesive composition was coated on a polarizing plate to a thickness of 20 μm, followed by drying at 90° C. for 4 minutes. Then, the adhesive composition was UV cured by exposure using a Lichtzen UV lamp. In Comparative Example 4, the adhesive composition was coated onto a polarizing plate to a thickness of 20 μM, followed by aging at 35° C./45% RH for 5 days, thereby curing the adhesive. The cured sample was cut into 125 mm×100 mm (length×width, 7 inches) specimens, which were stacked on a glass substrate. The specimens for measurement of light leakage were stacked on both sides of the glass substrate such that optical absorption axes of the polarizing plate were perpendicular to each other. The specimens were maintained at 323K for 1,000 seconds in an autoclave under vacuum in order to obtain good adhesion. The specimens were left at 80° C. for 250 hours or at 60° C. and 90% RH for 250 hours (moist-heat resistance conditions) and then left at 25° C. for 1 hour or more before use thereof. After operating a liquid crystal display using the sample, brightness at the front side of the display panel was measured at a height of 1 m using a brightness tester (RISA, Hiland Co., Ltd.). Specifically, brightness ⓒ at the central region of the panel and brightnesses ⓐ, ⓑ, ⓓ, and ⓔ at corners of the panel at which light leakage occurred were measured. As shown in FIG. 2, brightness measuring points were placed at midpoints of sides of the panel. Here, each side of the panel adjoined the circumference of a circle for brightness measurement having a radius of 0.5 cm. In FIG. 2, ⓐ, ⓑ, ⓒ, ⓓ and ⓔ indicate brightness measuring points. The degree of light leakage (ΔL) was quantified according to the following Equation 1. A lower ΔL value means better light leakage characteristics, which are evaluated according to the following criteria. Light leakage was measured for 7 inches and obtained as a ΔL value according to Equation 1.

$$\Delta L = [(a+b+d+e)/4]/c - 1 \quad \text{[Equation 1]}$$

In Equation 1, a, b, d and e are brightness values measured at the edge portions ⓐ, ⓑ, ⓓ and ⓔ corresponding to

TABLE 2

| | | Examples | | | | | Comparative examples | | | |
|---|---|---|---|---|---|---|---|---|---|---|
| | | 1 | 2 | 3 | 4 | 5 | 1 | 2 | 3 | 4 |
| A | A1 | — | — | — | — | — | 20 | 20 | 20 | 20 |
| | A2 | 20 | — | — | — | — | — | — | — | — |
| | A3 | — | 20 | — | — | — | — | — | — | — |
| | A4 | — | — | 20 | — | — | — | — | — | — |
| | A5 | — | — | — | 20 | — | — | — | — | — |
| | A6 | — | — | — | — | 20 | — | — | — | — |
| B | | 1 | 1 | 0.7 | 0.5 | 0.5 | — | — | — | — |
| b | b1 | — | — | — | — | — | 1 | — | — | — |
| | b2 | — | — | — | — | — | — | 1 | — | — |
| | b3 | — | — | — | — | — | — | — | 1 | — |
| | b4 | — | — | — | — | — | — | — | — | 1 |
| C | | 0.06 | 0.06 | 0.06 | 0.06 | 0.06 | 0.06 | 0.06 | 0.06 | 0.06 |
| D | | 0.2 | 0.2 | 0.2 | 0.2 | 0.2 | 0.2 | 0.2 | 0.2 | 0.2 |
| Curing method | | UV curing | UV curing | UV curing | UV curing | UV curing | UV curing | UV curing | UV curing | Heat curing |
| Curing condition | | 1000 mJ/cm² | 1000 mJ/cm² | 1000 mJ/cm² | 1000 mJ/cm² | 1000 mJ/cm² | 1000 mJ/cm² | 1000 mJ/cm² | 1000 mJ/cm² | 35° C./RH 45% 5 days | brightness measurement points of FIG. 2, respectively, and c is a brightness value at the center ⓒ before reliability testing.

○: No light leakage, ΔL of 0 to 0.1.
Δ: Low light leakage, ΔL of greater than 0.1 to 0.7.
X: Significant light leakage, ΔL of greater than 0.7.

(2) Durability: The adhesive-coated polarizing plates were cut into 10 cm×8 cm specimens, which were attached to a liquid crystal display or a glass substrate, followed by compression at 50° C. and 3.5 atm. The prepared specimens were left at 85° C. for 250 hours (heat resistant conditions) or at 60° C./95% RH for 250 hours (moist-heat resistance conditions), and then left at 25° C. for 1 hour or more before use thereof. Durability was evaluated by observing whether the specimens suffered from bubbling or peeling at the ends thereof. Evaluation criteria were as follows.

○: Neither bubbling nor peeling
Δ: Slight bubbling or peeling
X: Significant bubbling or peeling (3) Storage modulus and loss modulus (Pa): Each of the prepared adhesives for polarizing plates was applied to a polyethylene terephthalate release film, followed by drying at 90° C. for 4 minutes, thereby preparing an adhesive sheet having a 20 μm thick adhesive layer. The prepared adhesive sheet was irradiated with UV at 1,000 mJ, thereby curing the adhesive layer. Several cured adhesive layers were stacked one above another to form a 1 mm thick adhesive sheet, which was then cut into a circular specimen having a diameter of 8 mm. Storage modulus and loss modulus of the specimen were measured using a storage modulus tester model MCR-501 (Physica Co., Ltd.) through frequency sweep testing at 30° C. and 85° C. and a frequency of 0.1 to 100 rad/s.

(4) Peel strength (gf/25 mm): 180° peel strength between the adhesive composition and a glass substrate was measured in accordance with Japanese Industrial Standard (JIS) 2107. The adhesive composition was coated onto a base film and dried such that the resultant adhesive layer had a thickness of 5 μm. The adhesive layer was subject to aging under conditions of 35° C./45% RH to prepare a sample. The sample was cut into 25 mm×100 mm (width×length) specimens, which were stacked on a glass substrate. Peel strength was measured using a tensile tester (e.g., a texture analyzer). The adhesive layer and glass substrate of each of the specimens were connected to upper and lower jigs, respectively, in a 30 kgf load cell. Then, peeling was performed at a tensile speed of 300 mm/min, and load at the time of peeling was measured.

(5) Creep (μm): After drying the adhesive composition, the adhesive composition was coated onto a polarizing plate such that the resultant adhesive layer had a thickness of 25 μm. The adhesive layer was subject to aging under conditions of 35° C./45% RH to prepare a sample. The adhesive layer-coated polarizing plate was attached to a glass plate such that the contact area therebetween was 1.5 cm×1.5 cm (width×length), and was left at 25° C. for 3 days, thereby preparing a specimen. Creep of the adhesive layer was measured using a universal testing machine (UTM) by applying a force of 2.250 kgf to the test specimen for 1,000 seconds and measuring the pushed distance (μm).

TABLE 3

| | | Examples | | | | | Comparative Examples | | | |
|---|---|---|---|---|---|---|---|---|---|---|
| | | 1 | 2 | 3 | 4 | 5 | 1 | 2 | 3 | 4 |
| Light leakage | Heat resistance light leakage | ○ | ○ | ○ | ○ | ○ | x | Δ | x | x |
| | Moist resistance light leakage | ○ | ○ | ○ | ○ | ○ | Δ | Δ | Δ | Δ |
| Durability | Heat resistance | ○ | ○ | ○ | ○ | ○ | Δ | Δ | Δ | ○ |
| | Moist heat resistance | ○ | ○ | ○ | ○ | ○ | x | Δ | Δ | ○ |
| Storage Modulus (Pa) | At 30° C. | $1.50 \times 10^5$ | $2.18 \times 10^5$ | $2.25 \times 10^5$ | $2.55 \times 10^5$ | $2.68 \times 10^5$ | $1.79 \times 10^5$ | $0.67 \times 10^5$ | $0.73 \times 10^5$ | $0.55 \times 10^5$ |
| | At 85° C. | $4.59 \times 10^4$ | $4.91 \times 10^4$ | $5.15 \times 10^4$ | $4.97 \times 10^4$ | $5.16 \times 10^4$ | $8.12 \times 10^4$ | $7.26 \times 10^4$ | $7.98 \times 10^4$ | $6.54 \times 10^4$ |
| Loss Modulus (Pa) | At 30° C. | $1.23 \times 10^5$ | $1.64 \times 10^5$ | $1.7 \times 10^5$ | $1.97 \times 10^5$ | $3.54 \times 10^5$ | $0.98 \times 10^5$ | $0.12 \times 10^5$ | $0.58 \times 10^5$ | $0.23 \times 10^5$ |
| | At 85° C. | $3.64 \times 10^4$ | $5.69 \times 10^4$ | $6.45 \times 10^4$ | $6.87 \times 10^4$ | $5.98 \times 10^4$ | $2.87 \times 10^4$ | $1.12 \times 10^4$ | $3.04 \times 10^4$ | $1.81 \times 10^4$ |
| Peel strength (gf/25 mm) | | 640 | 700 | 620 | 550 | 640 | 190 | 670 | 510 | 750 |
| Creep (μm) | | 240 | 210 | 190 | 165 | 145 | 190 | 340 | 260 | 260 |

As shown in Table 3, the adhesive compositions for polarizing plates according to Examples 1-5 were photocurable and exhibited good durability and excellent improvement in terms of light leakage under heat resistance and moist-heat resistance conditions. Further, the adhesive composition according to Examples 1-5 had desired modulus and peel strength within a predetermined range, thereby forming a semi-IPN (semi-interpenetrating polymer network) structure that has good balance between high modulus domain and flexible domain.

Conversely, the adhesive compositions of Comparative Examples 1 to 3, which included a fluorene structure, bisphenol A, or an aliphatic structure as a photocuring agent, respectively, suffered from light leakage and poor durability. In addition, the adhesive composition of Comparative Example 4, which included a typical heat-curing agent, suffered from light leakage.

By way of summation and review, acrylic copolymers contained in an adhesive for polarizing plates may be prepared by free radical polymerization. However, the acrylic copolymers prepared in this way may exhibit a high polydispersity index (PDI) and copolymers having a low molecular weight may be contained in the adhesive for polarizing plates. As a result, the polarizing plates may suffer from peeling, dragging, bubbling, cracking, or the like, thereby causing deterioration in durability. In addition, typical acrylic copolymers have disadvantages in minimization of light leakage.

Embodiments provide an adhesive composition for polarizing plates, a polarizing plate including an adhesive layer formed of the same, and an optical display including the same. The adhesive composition provides an adhesive layer that minimizes light leakage and provides high durability, thereby preventing the polarizing plates from suffering from peeling, dragging, bubbling, cracking, shrinkage, or the like.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. An adhesive composition for polarizing plates, the adhesive composition comprising a (meth)acrylic copolymer and a biphenyl group-containing photocuring agent, wherein the photocuring agent is represented by Formula 1:

[Formula 1]

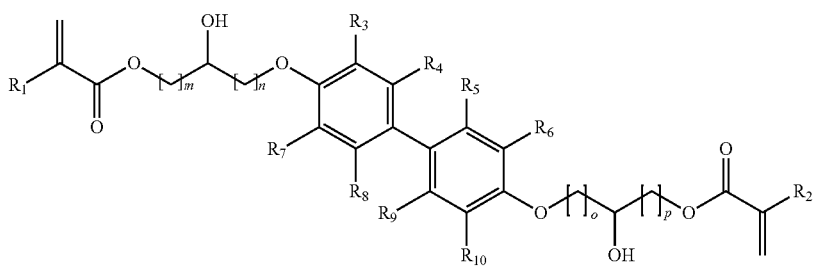

wherein $R_1$ and $R_2$ are each independently hydrogen or a methyl group, and $R_3$, $R_4$, $R_5$, $R_6$, $R_7$, $R_8$, $R_9$, and $R_{10}$ are each independently hydrogen, a $C_1$ to $C_5$ alkyl group, a $C_1$ to $C_5$ haloalkyl group, a $C_5$ to $C_{10}$ cycloalkyl group, or a $C_6$ to $C_{20}$ aryl group, and m and p are each independently 0 or 1, and n and o are each independently an integer of 1 to 4.

2. The adhesive composition as claimed in claim 1, wherein the photocuring agent has a weight average molecular weight of about 200 to about 3,000 g/mol.

3. The adhesive composition as claimed in claim 1, wherein the (meth)acrylic copolymer has a weight average molecular weight of about 100,000 to about 1,000,000 g/mol.

4. The adhesive composition as claimed in claim 1, wherein the (meth)acrylic copolymer has a polydispersity index of about 6.0 or less.

5. The adhesive composition as claimed in claim 1, wherein the (meth)acrylic copolymer is a copolymer of a monomer mixture including at least one of an alkyl group-containing (meth)acrylic monomer, a hydroxyl group-containing (meth)acrylic monomer, a carboxylic acid group-containing (meth)acrylic monomer, an alicyclic group-containing (meth)acrylic monomer, and a hetero ring-containing vinyl monomer.

6. The adhesive composition as claimed in claim 5, wherein the monomer mixture includes about 65 wt % to about 99 wt % of the alkyl group-containing (meth)acrylic monomer, about 0.1 wt % to about 20 wt % of the hydroxyl group-containing (meth)acrylic monomer, about 0.1 wt % to about 20 wt % of the carboxylic acid group-containing (meth)acrylic monomer, and about 0.1 wt % to about 20 wt % of the hetero ring-containing vinyl monomer.

7. The adhesive composition as claimed in claim 5, wherein the monomer mixture includes about 65 wt % to about 99 wt % of the alkyl group-containing (meth)acrylic monomer, about 0.1 wt % to about 20 wt % of the hydroxyl group-containing (meth)acrylic monomer, about 0.1 wt % to about 20 wt % of the carboxylic acid group-containing (meth)acrylic monomer, about 0.1 wt % to about 20 wt % of the hetero ring-containing vinyl monomer, and about 0.1 wt % to about 15 wt % of the alicyclic group-containing (meth)acrylic monomer.

8. The adhesive composition as claimed in claim 1, wherein the (meth)acrylic copolymer includes a trithiocarbonate structure in a backbone thereof.

9. The adhesive composition as claimed in claim 5, wherein the (meth)acrylic copolymer includes a trithiocarbonate structure in a backbone thereof.

10. The adhesive composition as claimed in claim 1, further comprising at least one of a silane coupling agent and a peel strength regulator.

11. The adhesive composition as claimed in claim 1, wherein the adhesive composition is photocurable.

12. The adhesive composition as claimed in claim 1, wherein the adhesive composition has a storage modulus (G') of about $1\times10^4$ Pa to about $5\times10^5$ Pa at 85° C., as measured at a frequency of about 0.1 to about 100 rad/s after UV curing.

13. The adhesive composition as claimed in claim 1, wherein the adhesive composition has a loss modulus (G) of about $1\times10^3$ Pa to about $7\times10^4$ Pa at 85° C., as measured at a frequency of about 0.1 to about 100 rad/s after UV curing.

14. A polarizing plate, comprising:
a polarizer;
a protective film formed on at least one side of the polarizer; and
an adhesive layer formed on the other side of the protective film, wherein the adhesive layer is formed of the adhesive composition as claimed in claim 1.

15. A polarizing plate, comprising:

a polarizer; and an adhesive layer formed on at least one side of the polarizer; wherein the adhesive layer is formed of the adhesive composition of claim 1, wherein the adhesive composition has a ratio G'/G of storage modulus G' to loss modulus G from about 0.6 to about 1.5 at 85° C. and at a frequency of about 0.1 rad/s to about 100 rad/s after UV curing.

16. An optical display comprising the polarizing plate as claimed in claim 14.

17. An optical display, comprising:

a polarizer;

an adhesive layer formed on at least one side of the polarizer; wherein the adhesive layer is formed of the adhesive composition of claim 1 and a liquid crystal panel, wherein the adhesive layer has a ratio G'/G of storage modulus G' to loss modulus G from about 0.6 to about 1.5 at 85° C. and at a frequency of about 0.1 rad/s to about 100 rad/s after UV curing.

* * * * *